United States Patent [19]
Rolli

[11] 3,830,171

[45] Aug. 20, 1974

[54] ROTARY TUBULAR FURNACES

[75] Inventor: Hans Rolli, Zurich, Switzerland

[73] Assignee: Kebe Anstalt fur Vertrieb von Arlagen fur Kehrichtbeseitigung, Vaduz, Liechtenstein

[22] Filed: May 29, 1973

[21] Appl. No.: 364,410

[30] Foreign Application Priority Data
June 6, 1972 Switzerland.......................... 8351/72

[52] U.S. Cl..................... 110/14, 432/116, 432/118
[51] Int. Cl. .............................................. F23g 5/06
[58] Field of Search..................................... 110/14; 432/105–118

[56] References Cited
UNITED STATES PATENTS
2,959,407  11/1960  Irish..................... 432/118
3,227,430  1/1966  Vaughan, Jr..................... 432/116
3,720,004  3/1973  Okawara........................... 110/14 X Primary Examiner—Kenneth W. Sprague
Attorney, Agent, or Firm—Eric H. Waters

[57] ABSTRACT

A rotary tubular furnace, for example for incinerating refuse comprises an internal grid structure which divides the interior of the furnace into a plurality of longitudinally extending passages. The grid structure comprises a number of individual grid sections which are carried by diametrically extending rods. The diametrically extending rods are removable from the furnace from the outside of the furnace and directly support removable longitudinal rods which support the grid sections. By removing the longitudinal rods, the grid sections can be removed from the furnace.

6 Claims, 4 Drawing Figures

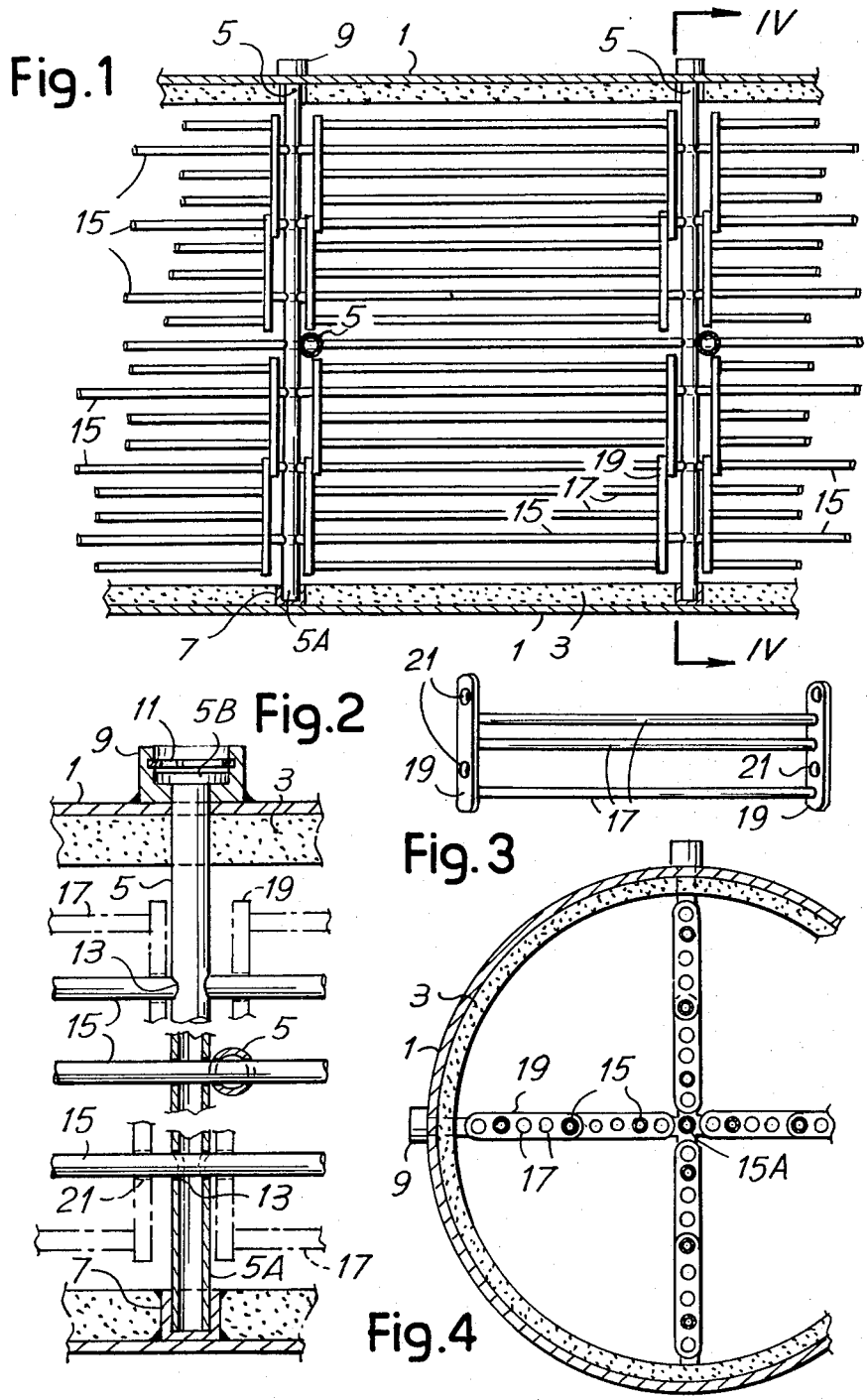

ROTARY TUBULAR FURNACES

BACKGROUND OF THE INVENTION

1. Field of the Invention

The present invention relates to rotary tubular furnaces.

2. Description of the Prior Art

There has been proposed, for example in Italian Pat. No. 877,649 a tubular furnace rotatable about an inclined axis, for incinerating, for example, domestic and other refuse material. Loading means are provided at the upper end of the furnace and discharge means at the lower end whereby to provide substantially continuous operation of the furnace.

In order to promote efficient combustion of the material, at least a portion of the interior of the furnace is divided longitudinally into two or more passages by means of substantially radial grids; in this manner, the material entering one of the passage remains in that passage during the rotation of the furnace and is located in the central portion of the furnace (and thus within the central portion of the flame) while the passage is moving along the upper portion of its circular path.

In this previously proposed furnace a requirement exists for the grids to be easily replaceable since they are liable to wear relatively rapidly due to the thermal and/or mechanical conditions within the furnace. Further, the replacement operation should be capable of being carried out relatively quickly in order to avoid a prolonged interruption in the operation of the plant associated with the furnace.

SUMMARY OF THE INVENTION

According to the present invention, there is provided a rotary tubular furnace comprising grid means extending substantially radially and dividing longitudinally at least a portion of the interior of the furnace into at least two passages, said grid means comprising a plurality of grid sections, and a plurality of diametrically extending rods, said rods being removable from the furnace from the outside, and the rods removably mounting the grid sections.

BRIEF DESCRIPTION OF THE DRAWINGS

An embodiment of the invention will now be described, by way of example only with reference to the accompanying diagrammatic drawing, in which:

FIG. 1 is a fragmentary longitudinal section of a furnace in accordance with the present invention;

FIG. 2 shows a detail of FIG. 1 to an enlarged scale, and partly in section;

FIG. 3 is a perspective view of a grid section of the furnace; and

FIG. 4 is a fragmentary section taken on line IV—IV of FIG. 1.

DESCRIPTION OF THE PREFERRED EMBODIMENT

As shown in the drawing, the furnace comprises a cylindrical metal shell 1 internally lined with a layer 3 of a thermally insulating material, for example refractory material, capable of withstanding high temperatures.

In order to support an internal radial grid structure, which is shown in the form of two diametrical grids perpendicular to each other, a plurality of solid or tubular rods 5 are inserted into diametral seats formed in the shell 1 and the layer 3. The rods 5 are insertable into the seats from the outside of the shell by axial movement of the rods, the rods being removable by axial movement in the reverse direction.

More particularly, the rods 5 each have an inner end portion 5A accommodated in a diametral seat 7 opening into the interior kiln and formed in the layer 3. The opposite end portion of each rod 5 has a head 5B located in a diametral seat 9 provided on the external surface of the shell 1. Retaining means, for example a resilient ring 11, can be provided to releasably retain the rod with the seats; alternatively other releasable retaining means for example plugs or latches, can be used. The rods 5 are located in respective planes at right angles and corresponding to the planes of the two grids inside the shell 1.

The rods 5 have seats 13 which extend transversely therethrough; the seats 13 are arranged to receive longitudinal rods 15 which are insertable and removable axially. The rods 15 can have a length equal to that of the furnace, or two or more rods can be arranged in succession with the sum of their lengths being substantially equal to the length of the furnace. Suitable means can be provided to retain the longitudinal rods 15 in their operational position.

The rods 15 are arranged to support demountable grid sections which when assembled form the diametral grids. Such a grid section is shown in FIG. 3 and comprises a number of longitudinal bars 17 connected to one another by at least two cross members 19 arranged for example at the opposite end portions of the bars 17. The cross members 19 are in the form of plates and have seats 21 for the longitudinal rods 15; the seats 21 are arranged in such a manner that the longitudinal rods 15 cooperate with the bars 17 to create a substantially uniform grid with the same spacing between adjacent bars 17 and between the rods 15 and the bars 17 adjacent thereto.

In order to assemble the grid structure, the rods 5 are inserted into the seats 7, 9 and then the rods 15 are inserted into the seats 13 of the rods 5, the grid sections being mounted on the rods 15 during the insertion of the latter into the seats 13. In order to disassemble the structure the rods 15 are withdrawn axially whereby the grid sections are released and the rods 5 can be withdrawn from the outside. In this manner, parts of the grid structure that are no longer usable, can readily be replaced.

As shown in FIG. 4, there is provided a central longitudinal rod 15A, which does not engage any of the grid sections, but only the rods 5; this rod 15A can be arranged to complete the grid structure formed by the grid sections the rod 15A being arranged on the longitudinal axis of the furnace. Alternatively the grid sections can be distributed and positioned in such a manner that the bars 17 of the grid sections complete the grids in the zone of the axis of the furnace, thus obviating the central rod 15A.

What is claimed is:

1. A rotary tubular furnace comprising
   grid means extending substantially radially and dividing longitudinally at least a portion of the interior of the furnace into at least two passages, said grid means comprising
   a plurality of grid sections, a plurality of diametrically extending rods supporting said grid sections, removable support means on the exterior of said furnace for supporting said diametrically extending rods, said diametrically extending rods being removable from the furnace from the outside thereof after removal of said removable support means, said rods supporting removably said grid sections.

2. A furnace according to claim 1, wherein groups of said diametrically extending rods are coplanar, said furnace further comprising longitudinally extending rods, each said longitudinally extending rod being slidably engaged with the diametrically extending rods of a respective group, and the grid sections being slidably engaged with the longitudinally extending rods to be supported thereby whereby the grid sections are removable by withdrawing in a longitudinal direction the longitudinally extending rods.

3. A frame according to claim 2, wherein each said grid section comprises a plurality of parallel bars, and cross-members connecting the bars, the said longitudinally extending rods extending through the cross members and being parallel with the bars.

4. A furnace according to claim 1, further comprising a plurality of longitudinally extending rods, one said longitudinally extending rod engaging at least two contiguous grid sections, and at least two longitudinally extending rods engaging each grid section.

5. A furnace according to claim 2 wherein said diametrically extending rods have transverse holes for slidably supporting said longitudinally extending rods.

6. A furnace according to claim 2 wherein said longitudinally extending rods have transverse holes for slidably supporting said diametrically extending rods.

* * * * *